(12) United States Patent
Paulsen et al.

(10) Patent No.: US 8,852,452 B2
(45) Date of Patent: *Oct. 7, 2014

(54) CORE-SHELL LITHIUM TRANSITION METAL OXIDES

(75) Inventors: Jens Paulsen, Daejeon (KR); Randy De Palma, Maasmechelen (BE); HeonPyo Hong, BeakSeokDong (KR); KyuBo Kim, Jangan-Gu (KR)

(73) Assignee: Umicore, Brussels (BE)

( * ) Notice: Subject to any disclaimer, the term of this patent is extended or adjusted under 35 U.S.C. 154(b) by 0 days.

This patent is subject to a terminal disclaimer.

(21) Appl. No.: 13/505,595

(22) PCT Filed: Oct. 19, 2010

(86) PCT No.: PCT/EP2010/006352
§ 371 (c)(1),
(2), (4) Date: Jul. 2, 2012

(87) PCT Pub. No.: WO2011/054441
PCT Pub. Date: May 12, 2011

(65) Prior Publication Data
US 2012/0261610 A1    Oct. 18, 2012

Related U.S. Application Data

(60) Provisional application No. 61/344,233, filed on Jun. 16, 2010.

(30) Foreign Application Priority Data

Nov. 5, 2009 (EP) .................................... 09013886
Jun. 3, 2010 (EP) .................................... 10005784

(51) Int. Cl.
| | | |
|---|---|---|
| H01M 4/88 | (2006.01) | |
| H01M 4/36 | (2006.01) | |
| H01M 4/62 | (2006.01) | |
| H01M 4/525 | (2010.01) | |
| H01M 4/131 | (2010.01) | |
| H01M 4/505 | (2010.01) | |
| H01M 4/1391 | (2010.01) | |
| H01M 10/052 | (2010.01) | |

(52) U.S. Cl.
CPC ................. $H01M\ 4/62$ (2013.01); $H01M\ 4/366$ (2013.01); $H01M\ 10/052$ (2013.01); $H01M\ 4/623$ (2013.01); $Y02E\ 60/122$ (2013.01); $H01M\ 4/525$ (2013.01); $H01M\ 4/131$ (2013.01); $H01M\ 4/505$ (2013.01); $H01M\ 4/1391$ (2013.01)
USPC .............. 252/182.1; 252/500; 252/519.1; 29/623.5; 423/179.5; 428/421; 429/200; 429/206; 429/209; 429/338

(58) Field of Classification Search
USPC ............ 252/500, 519.1, 182.1; 429/200, 209, 429/338, 206; 423/179.5; 428/421; 29/623.5
See application file for complete search history.

(56) References Cited

U.S. PATENT DOCUMENTS

| | | | | |
|---|---|---|---|---|
| 5,916,516 A | * | 6/1999 | Kolb | ............................ 29/623.5 |
| 5,968,683 A | | 10/1999 | Kolb | |
| 7,655,354 B2 | * | 2/2010 | Kawase et al. | ................ 429/209 |
| 2003/0027046 A1 | | 2/2003 | Hosokawa et al. | |
| 2003/0215716 A1 | | 11/2003 | Suzuki et al. | |
| 2005/0034993 A1 | * | 2/2005 | Gozdz et al. | ..................... 205/57 |
| 2008/0254368 A1 | | 10/2008 | Ooyama et al. | |
| 2009/0087362 A1 | | 4/2009 | Sun et al. | |
| 2009/0087740 A1 | * | 4/2009 | Deguchi et al. | ............... 429/200 |
| 2009/0191460 A1 | | 7/2009 | Fujiwara et al. | |
| 2009/0194747 A1 | | 8/2009 | Zou et al. | |
| 2009/0226810 A1 | | 9/2009 | Paulsen et al. | |

FOREIGN PATENT DOCUMENTS

| | | | | |
|---|---|---|---|---|
| EP | 1873847 | | 1/2008 | |
| JP | 06-333565 | * | 12/1994 | .............. H01M 4/58 |
| JP | 6-333565 A | | 12/1994 | |
| JP | 08-264183 | * | 10/1996 | .............. H01M 4/58 |
| JP | 8-264183 A | | 10/1996 | |
| JP | 2003142093 | | 5/2003 | |
| JP | 2007265668 | | 10/2007 | |

OTHER PUBLICATIONS

Croguennec et al., Synthesis of "$Li_{1.1}(Ni_{0.425}Mn_{0.425}Co_{0.15})_{0.9}O_{1.8}F_{0.2}$ Materials by Different Routes: Is There Fluorine Substitution for Oxygen?" Journal of The Electrochemical Society, vol. 156, No. 5, (2009), pp. A349-A355.

International Preliminary Report on Patentability, issued in co-assigned PCT/EP2010/006351, dated May 18, 2012.

International Preliminary Report on Patentability, issued in PCT/EP2010/006352, dated Nov. 29, 2011.

International Search Report, issued in co-assigned PCT/EP2010/006351, dated Nov. 24, 2010.

International Search Report, issued in PCT/EP2010/006352, dated Feb. 7, 2011.

Menetrier et al., "NMR Evidence of LiF Coating Rather than Fluorine Substitution in $Li(Ni_{0.425}Mn_{0.425}Co_{0.15})O_2$," Journal of Solid State Chemistry, vol. 181, No. 12, (Dec. 1, 2008), pp. 3303-3307.

* cited by examiner

*Primary Examiner* — Khanh Tuan Nguyen
(74) *Attorney, Agent, or Firm* — Brinks Gilson & Lione

(57) ABSTRACT

A lithium transition metal oxide powder for use in a rechargeable battery is disclosed, where the surface of the primary particles of said powder is coated with a LiF layer, where this layer consists of a reaction product of a fluorine-containing polymer and the primary particle surface. The lithium of the LiF originates from the primary particles surface. Examples of the fluorine-containing polymer are either one of PVDF, PVDF-HFP or PTFE. Examples of the lithium transition metal oxide are either one of —$LiCo_d MeO_2$, wherein M is either one of both of Mg and Ti, with $e<0.02$ and $d+e=1$; —$Li_{1+a}M'_{1-a}O_{2\pm b}M^1{}_k S_m$ with $-0.03<a<0.06$, $b<0.02$, M' being a transition metal compound, consisting of at least 95% of either one or more elements of the group Ni, Mn, Co and Ti; $M^1$ consisting of either one or more elements of the group Ca, Sr, Y, La, Ce and Zr, with $0 \le k \le 0.1$ in wt %; and $0<m<0.6$, m being expressed in mol %; and —$Li_{a'}Ni_x CO_y M''_z O_{2\pm e} A_f$ with $0.9<a'<1.1$, $0.5 \le x \le 0.9$, $0<y \le 0.4$, $0<z \le 0.35$, $e<0.02$, $0 \le f \le 0.05$ and $0.9<(x+y+z+f)<1.1$; M" consisting of either one or more elements from the group Al, Mg, and Ti; A consisting of either one or both of S and C.

8 Claims, 3 Drawing Sheets

Figure 1.1
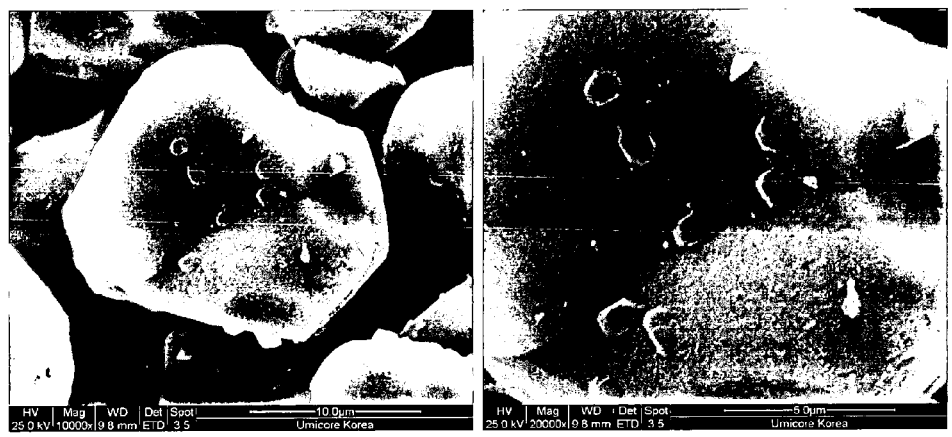
Figure 1.2
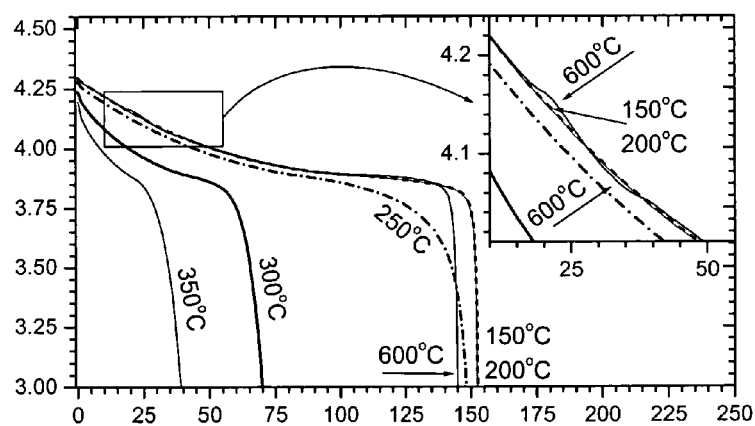
Figure 1.3

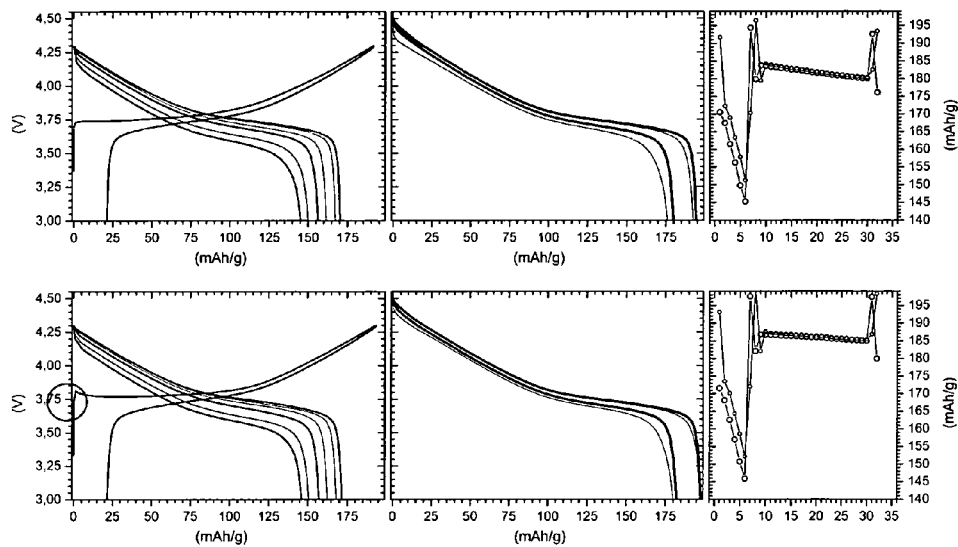
Figure 2
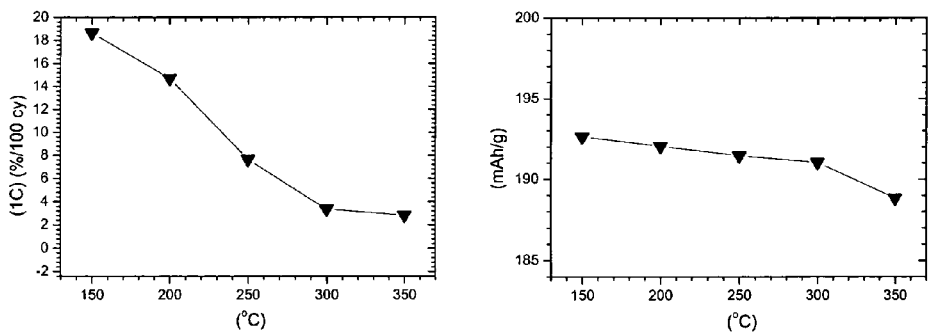
Figure 3.1
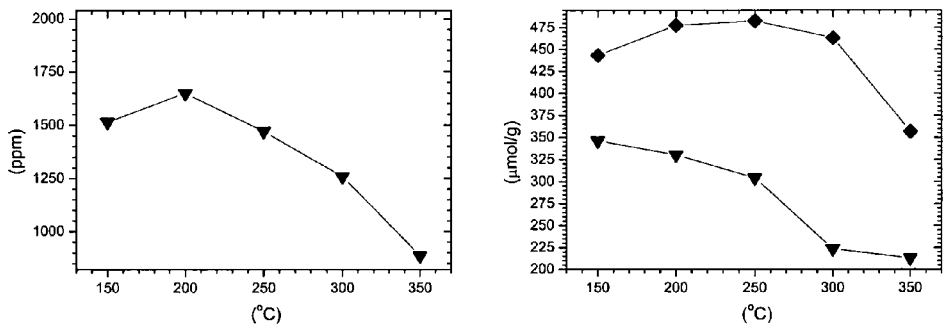
Figure 3.2

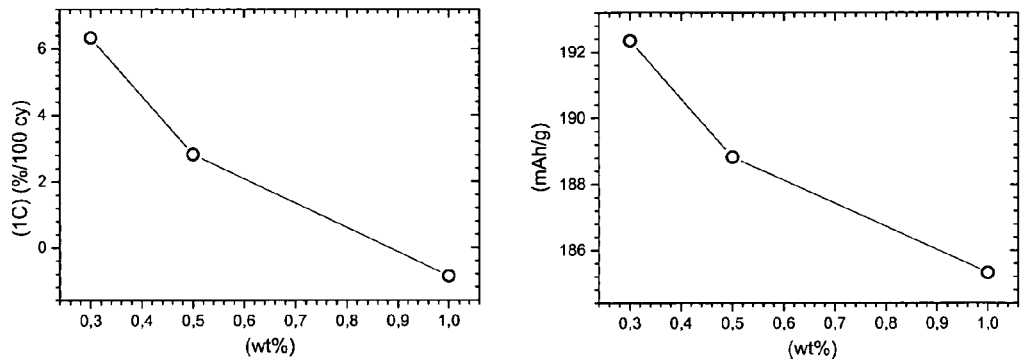
Figure 3.3
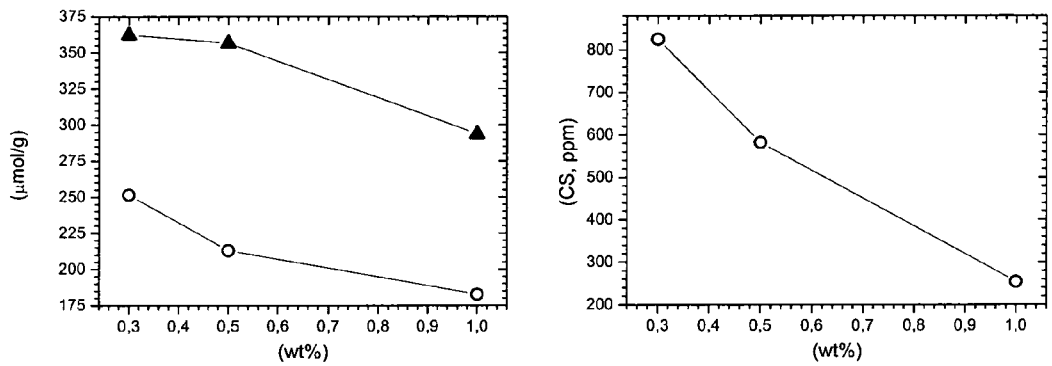
Figure 3.4
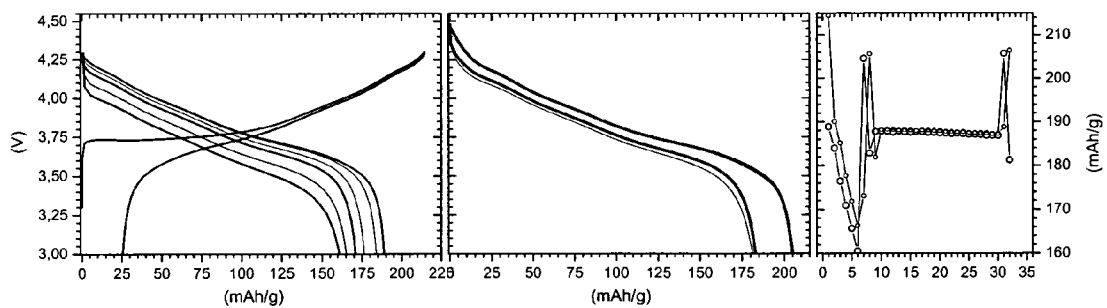
Figure 3.5

CORE-SHELL LITHIUM TRANSITION METAL OXIDES

This application is a National Stage application of International Application No. PCT/EP2010/006352, filed Oct. 19, 2010, which claims the benefit of U.S. Provisional Application No. 61/344,233, filed Jun. 16, 2010, the entire contents of which are hereby incorporated herein by reference. This application also claims priority under 35 U.S.C. §119 to European Patent Application No. 09013886.8, filed Nov. 5, 2009, and European Patent Application No. 10005784.3, filed Jun. 3, 2010, the entire contents of which are hereby incorporated herein by reference.

TECHNICAL FIELD AND BACKGROUND

The invention relates to cathode material for rechargeable lithium batteries, particularly lithium nickel manganese cobalt oxides being coated with a fluorine containing polymer and heat treated afterwards.

Previously $LiCoO_2$ was the most used cathode material for rechargeable lithium batteries. However, recently a substitution of $LiCoO_2$ by lithium nickel oxide based cathodes and by lithium nickel manganese cobalt oxides is in full progress. In these substitute materials, depending on the choice of metal composition, different limitations occur or challenges need to be solved. For simplicity reasons, the term "Lithium nickel oxide based cathodes" will be further referred to as "LNO", and "lithium nickel manganese cobalt oxides" will be further referred to as "LMNCO".

One example of an LNO material is $LiNi_{0.80}Co_{0.15}Al_{0.05}O_2$. It has a high capacity, however it is difficult to prepare, since typically a carbon dioxide free atmosphere (oxygen) is needed and special carbonate free precursors like lithium hydroxide are used instead of lithium carbonate. Hence such manufacturing restraints tend to increase the cost of this material considerably. LNO is a very sensitive cathode material. It is not fully stable in air, which makes large scale battery production more difficult, and—caused by its lower thermodynamic stability—in real batteries it is responsible for a poor safety record. Finally, it is very difficult to produce lithium nickel oxide with a low content of soluble base.

By "soluble base" is meant lithium located near to the surface that is less stable thermodynamically and goes into solution, whilst lithium in the bulk is thermodynamically stable and cannot be dissolved. Thus a gradient of Li stability exists, between lower stability at the surface and higher stability in the bulk. The presence of "soluble base" is a disadvantage because a high base content is often connected with problems during battery manufacturing: during slurry making and coating high base causes a degradation of the slurry (slurry instability, gelation) and high base is also a responsible for poor high temperature properties, like excessive gas generation (swelling of the batteries) during high temperature exposure. By determining the "soluble base" content by pH titration, based on the ion exchange reaction ($LiMO_2 + \delta H^+ \leftarrow \rightarrow Li_{1-\delta}H_\delta MO_2 + \delta Li^+$), the Li gradient can be established. The extent of this reaction is a surface property.

In US2009/0226810A1 the problem of soluble base is further discussed: $LiMO_2$ cathode material is prepared using mixed transition metal hydroxides as precursors. These are obtained by co-precipitating transition metal sulphates and technical grade bases like NaOH, which is the cheapest industrial route for $LiMO_2$ precursor preparation. This base contains $CO_3^{2-}$ anion in the form of $Na_2CO_3$, which is trapped in the mixed hydroxide—the mixed hydroxide typically containing between 0.1 and 1 wt % of $CO_3^{2-}$. Besides the transition metal precursor, the lithium precursor $Li_2CO_3$, or a technical grade $LiOH*H_2O$, containing at least 1 wt % of $Li_2CO_3$ is used. In the case of high nickel cathodes LNO, when the lithium and transition metal precursors are reacted at high temperature, typically above 700° C., the $Li_2CO_3$ impurity remains in the resulting lithium transition metal oxide powder, especially on its surface. When higher purity materials are used, less $Li_2CO_3$ impurity is found, but there is always some LiOH impurity that reacts with $CO_2$ in the air to form $Li_2CO_3$. Such a solution is proposed in JP2003-142093, however the use of expensive precursors of very high purity is not preferred.

An example of LMNCO is the well known $Li_{1+x}M_{1-x}O_2$ with $M = Mn_{1/3}Ni_{1/3}Co_{1/3}O_2$, where the manganese and nickel content is about the same. "LMNCO" cathodes are very robust, easy to prepare, have a relatively low content of cobalt and thus generally tend to cost less. Their main drawback is a relatively low reversible capacity. Typically, between 4.3 and 3.0V the capacity is less than or about 160 mAh/g, compared with 185-195 mAh/g for LNO cathodes. A further drawback of LMNCO compared with LNO is the relatively low crystallographic density, so the volumetric capacity is also less; and a relatively low electronic conductivity.

In between LNO and LMNCO type materials we can situate "Nickel rich lithium nickel manganese cobalt oxides" $Li_{1+x}M_{1-x}O_2$ where $M = Ni_{1-x-y}Mn_xCo_y$ or $M = Ni_{1-x-y-z}Mn_xCo_yAl_z$, with Ni:Mn larger than 1, having typically values for Ni:Mn of 1.5 to 3, and a Co content "y" typically between 0.1 and 0.35. For simplicity we refer to this class of materials as "LNMO". Examples are $M = Ni_{0.5}Mn_{0.3}Co_{0.2}$, $M = Ni_{0.67}Mn_{0.22}Co_{0.11}$, and $M = Ni_{0.6}Mn_{0.2}Co_{0.2}$.

Compared with LNO, LNMO can be prepared by standard processes (using a $Li_2CO_3$ precursor) and no special gas (such as oxygen as mentioned above) is needed. Compared to LMNCO, LNMO has a much higher intrinsic capacity and possibly a lower tendency to react with electrolyte (which is normally characterized by dissolution of Mn) at elevated temperature. Thus it becomes apparent that LNMO will possibly play a major role in the substitution of $LiCoO_2$. Generally, the base content increases, and the safety performance tends to deteriorate with increasing Ni:Mn ratio. On the other hand it is widely accepted that high Mn content helps to improve safety.

A high base content is related to moisture sensitivity. In this regard LNMO is less moisture sensitive than LNO but more sensitive than LMNCO. Directly after preparation, a well prepared LNMO sample has a relatively low content of surface base, and if it is well prepared most of the surface base is not $Li_2CO_3$ type base. However, in the presence of moisture, airborn $CO_2$ or organic radicals reacts with LiOH type base to form $Li_2CO_3$ type base. Similar, the consumed LiOH is slowly re-created by Li from the bulk, thus increasing the total base (total base=mol of $Li_2CO_3$+LiOH type base). At the same time, the moisture (ppm $H_2O$) increases. These processes are very bad for battery making. $Li_2CO_3$ and moisture are known to cause severe swelling, and to deteriorate the slurry stability. Hence it is desired to decrease the moisture sensitivity of LNMO and LNO materials.

In US2009/0194747A1 a method to improve the environmental stability of LNO cathode materials is described. The patent discloses a polymer coating of nickel based cathode materials, in the form of a single layer of non-decomposed polymer. The polymers (e.g. PVDF) are chosen from binders typically used in the manufacturing (slurry making for electrode coating) of lithium ion batteries.

Thermal stability (safety) is related to interfacial stability between electrolyte and cathode material. A typical approach to improve the surface stability is by coating. Many different examples of coatings are available in literature and especially in patent literature. There are different ways to categorize coatings. For example, we can distinguish between ex-situ and in-situ coating. In ex-situ coating a layer is coated onto the particles. The coating can be obtained by dry or wet coating. Generally the coating is applied in a separate process involving at least the coating step and generally an additional heating step. Thus the total cost of the process is high.

Alternatively, in some cases an in-situ coating—or self organized coating—is possible. In this case the coating material is added to the blend before cooking, and during cooking separate phases form, preferable the coating phase becomes liquid, and if the wetting between $LiMO_2$ and the coating phase is strong then a thin and dense coating phase ultimately covers the electrochemical active $LiMO_2$ phase. Evidently, in-situ coating is only efficient if the coating phase wets the core.

One can also distinguish between cationic and anionic coating. An examples for cationic coating is $Al_2O_3$ coating. Examples for anionic coating are fluoride, phosphate, silicate coating and the like. Fluoride coating is especially preferred because a protecting film of LiF is formed. Thermodynamically LiF is very stable, and does not react with electrolyte, thus LiF coating is very promising to achieve a good stability at high temperature and voltage. A typical method, such as used by Croguennec et al. in Journal of The Electrochemical Society, 156 (5) A349-A355 (2009), is the addition of LiF to the lithium transition metal oxide to achieve the protecting LiF film. However, due to the high melting point of LiF and also due to poor wetting properties, it is not possible to obtain a thin and dense LiF film. Croguennec reports that, instead of a coating, small particles or 'sheets' can be found in the grain boundaries of the $LiMO_2$ particles. Further possible methods are the use of $MgF_2$, $AlF_3$ or lithium cryolite.

One can further distinguish between inorganic and organic coating. An example of organic coating is a polymer coating. One advantage of polymer coating is the possibility of obtaining an elastic coating. On the other hand, problems arise from poor electronic conductivity, and sometimes the poor transport of lithium across the polymer. Generally, polymer coating more or less adheres to the surface, but it does not chemically change the surface. There cannot be found any experimental data in the prior art that would show that the above described approaches are effective to improve the cited problems of LNO and LNMO materials.

To summarize:
1) LMNCO is a robust material but has severe capacity limitations.
2) It is desired to increase the thermal stability and to reduce the base content of LNO.
3) It is desired to increase the thermal stability and reduce the base content of LNMO. It is an aim of the present invention to improve or even overcome the problems cited before, and to provide for high capacity alternatives for LMNCO materials.

SUMMARY

Viewed from a first aspect, the invention can provide a lithium transition metal (M) oxide powder for use in a rechargeable battery composed of primary particles having a surface coated with LiF, characterized in that the soluble base content of said lithium transition metal oxide powder, determined by pH titration, is less than 60%, and preferably less than 50% of the soluble base content of said lithium transition metal oxide powder having uncoated primary particles. In one embodiment, the surface of said lithium transition metal oxide powder is substantially free of lithium hydroxide and lithium carbonate. The LiF layer consists of a reaction product of a fluorine-containing polymer and the primary particle surface, where the lithium of the LiF originates from the primary particles surface. The fluorine in the reaction product LiF originates from fully decomposed fluorine-containing polymer. In one embodiment the LiF film has a thickness of at least 0.5 nm, or at least 0.8 nm, and even at least 1 nm.

An example of the lithium transition metal oxide can be either one of:
- $LiCO_dM_eO_2$, wherein M is either one or both of Mg and Ti, with $e<0.02$ and $d+e=1$;
- $Li_{1+a}M'_{1-a}O_{2\pm b}$ $M^1_kS_m$ with $-0.03<a<0.06$, $b<0.02$, M' being a transition metal compound, consisting of at least 95% of either one or more elements of the group Ni, Mn, Co, Mg and Ti; $M^1$ consisting of either one or more elements of the group Ca, Sr, Y, La, Ce and Zr, with $0\le k\le 0.1$ in wt %; and $0\le m\le 0.6$, m being expressed in mol %; and
- $Li_aNi_xCo_yM''_zO_{2\pm e}A_f$ with $0.9<a'<1.1$, $0.5\le x\le 0.9$, $0<y\le 0.4$, $0<z\le 0.35$, $e<0.02$, $0\le f\le 0.05$ and $0.9<(x+y+z+f)<1.1$; M'' consisting of either one or more elements from the group Al, Mg, and Ti; A consisting of either one or both of S and C.

In an example embodiment, $M'=Ni_{a''}Mn_{b''}Co_{c''}$, with $a''>0$, $b''>0$, $c''>0$ and $a''+b''+c''=1$; and $a''/b''>1$. In another embodiment $0.5\le a''\le 0.7$, $0.1<c''<0.35$, and $a''+b''+c''=1$. The embodiments where $a''/b''>1$ are particularly suitable for use in lithium-ion prismatic or polymer batteries.

In another example of cathode material, the fluorine-containing polymer contains at least 50% by weight of fluorine. A typical example for such a polymer is a PVDF homopolymer or PVDF copolymer (such as HYLAR® or SOLEF® PVDF, both from Solvay SA, Belgium). Another known PVDF based copolymer is for example a PVDF-HFP (hexa-fluoro propylene). Such polymers are often known under the name "Kynar®". Teflon—or PTFE—could also be used as polymer.

Viewed from a second aspect, the invention can provide a process for covering a lithium transition metal (M) oxide powder with a LiF coating, comprising the steps of:
- providing a transition metal precursor, such as MOOH, prepared from the co-precipitation of transition metal sulphates with a base, such as NaOH,
- providing a lithium precursor being either one of $LiOH*H_2O$ or $LiNO_3$, both containing a carbonate impurity, or said lithium precursor being $Li_2CO_3$,
- reacting said transition metal precursor and said lithium precursor at a temperature above 600° C., thereby obtaining said lithium transition metal (M) oxide powder carrying a $Li_2CO_3$ impurity,
- mixing said powder with a fluorine-containing polymer, and
- heating said powder-polymer mixture at a temperature of at least 140° C., and at most 300 or even at most 210° C., above the melting temperature of said fluorine-containing polymer.

The NaOH used generally also contains a carbonate ion impurity, which is especially relevant for LNO materials for reasons described above, and which presence is also neutralized by the process provided by the invention.

In this example process a $Li_2CO_3$ impurity reacts with said polymer, said polymer is decomposed, and a LiF coating is formed on the surface of said transition metal (M) oxide powder. In particular, the $Li_2CO_3$ on or near to the surface of the transition metal oxide powder reacts with the polymer, providing lithium for the LiF Layer and $CO_2$ gas.

In an example process embodiment, the amount of fluorine-containing polymer in the powder-polymer mixture is between 0.1 and 2 wt %. In another embodiment it is between 0.2 and 0.5 wt %. In another example embodiment the LiF film has a thickness of at least 0.5 nm, or at least 0.8 nm, and even at least 1 nm.

One example process uses a fluorine-containing polymer such a PVDF, and the powder-polymer mixture is heated at a temperature higher than 325° C. and less than 380° C. for at least one hour, and, in a particular embodiment, between 340 and 360° C. for at least one hour.

An example of the lithium transition metal oxide used in the process is either one of:

$LiCo_dM_eO_2$, wherein M is either one or both of Mg and Ti, with $e<0.02$ and $d+e=1$;

$Li_{1+a}M'_{1-a}O_{2\pm b}M^1_kS_m$ with $-0.03<a<0.06$, $b<0.02$, M' being a transition metal compound, consisting of at least 95% of either one or more elements of the group Ni, Mn, Co and Ti; $M^1$ consisting of either one or more elements of the group Ca, Sr, Y, La, Ce and Zr, with $0\leq k\leq 0.1$ in wt %; and $0\leq m\leq 0.6$, m being expressed in mol %; and $Li_aNi_xCo_yM''_zO_{2\pm e}A_f$, with $0.9<a'<1.1$, $0.5\leq x\leq 0.9$, $0<y\leq 0.4$, $0<z\leq 0.35$, $e<0.02$, $0\leq f\leq 0.05$ and $0.9<(x+y+z+f)<1.1$; M'' consisting of either one or more elements from the group Al, Mg, and Ti; A consisting of either one or both of S and C.

In an example embodiment, $M'''=Ni_{a''}Mn_{b''}Co_{c''}$, with $a''>0$, $b''>0$, $c''>0$ and $a''+b''+c''=1$; and $a''/b''>1$. In another embodiment $0.5\leq a''\leq 0.7$, $0.1<c''<0.35$, and $a''+b''+c''=1$.

BRIEF DESCRIPTION OF THE DRAWINGS

FIG. 1.1: SEM micrograph of a 1% PVDF+99% $LiCoO_2$ mixture after heat treatment to 350° C.

FIG. 1.2: SEM micrograph of a 1% PVDF+99% $LiCoO_2$ mixture after heat treatment to 600° C.

FIG. 1.3: Discharge voltage profile of the 1% PVDF–99% $LiCoO_2$ mixtures after heat treatment.

FIG. 2: Comparison of coin cell performance of a LiF coated sample and a fluorine free reference.

FIG. 3.1: Electrochemical performance as function of heat treatment temperature for 0.5 w % PVDF coating.

FIG. 3.2: Moisture content after air exposure and base content before and after air exposure as function of treatment temperature for 0.5 w % PVDF coating.

FIG. 3.3: Coin cell testing results for samples treated at 350° C. as a function of PVDFcontent.

FIG. 3.4: Carbon impurity content and base content for samples treated at 350° C. as a function of PVDFcontent.

FIG. 3.5: Coin cell testing details of a 0.5 w % PVDF coated sample treated at 350° C.

DETAILED DESCRIPTION

In simple terms, the structure of the example cathode material can for example be described as a core-shell design. The shell is not obtained by coating but by an in-situ reaction between an initial coating and the surface of the material core. The reaction occurs at a certain heating temperature as is disclosed below. The initial coating is a thin layer of polymer. The polymer is completely decomposed and reacted into a very thin inner layer of lithium fluoride, which covers the core, for example of LNO or LNMO materials. The LiF layer originates from the reaction of the decomposing polymer with lithium containing surface base of the lithium transition metal oxides. Whereas a normal fluoride containing polymer, such as Kynar® just melts upon heating, it can be established that the contact with the Li (soluble) base on the surface of the transition metal oxide initiates a chemical reaction leading to the decomposition of the polymer. This decomposition could eventually end up in generating gasses that evaporate, and remaining carbon which, at sufficient high temperatures, decomposes as well, surprisingly without reacting with the particles to re-create a $Li_2CO_3$ type of base. It can be speculated that the LiF film protects the Li in the particle, thus preventing it from reacting with carbon to form $Li_2CO_3$. It is clear that this 'full' decomposition could only occur if enough heat is applied. The shell has the following function: the thin LiF based layer replaces the reactive surface base layer, thus reducing the base content to zero at the core's surface, and improving safety.

The examples of the surface coated lithium transition metal oxides do not correspond to the above described background coating categories: in the examples we observe the presence of a reaction product, originating from decomposed polymer, and the formation of a shell. Hence it is not a polymer coating as disclosed in US2009/0194747A1. Nor is it the same as anion coating, because the coating by LiF occurs at a low temperature, since at higher temperatures LiF crystallizes. Finally it is neither in-situ nor ex-situ coating but in fact something in between.

An example process of the covering of the lithium transition metal oxides comprises the following steps:

1) Mixing of the LNO or LNMO cathode with a small amount of pristine polymer.
2) Heating the mixture to a temperature above the melting point of the polymer and continuing to heat until the polymer reacts with the cathode powder.
3) Cooling down when the polymer has fully decomposed.

The mixing step in the example process can also consist of either (1) wet coating or (2) dry coating. In a wet coating process the polymer is dissolved in a solvent, then the powder is immersed in the solution and the slurry (or moist powder) is dried. In a dry coating process the polymer powder is mixed with the powder, heated to a temperature above the melting point of the polymer, and then the molten polymer wets the surface. In one embodiment of the dry coating, a polymer having a small primary particle size, for example much below 1μ is used, in order to obtain a good surface coverage.

In the example process above the LNO/LNMO cathode material is encapsulated in a very thin film. If the film is thick, then it is difficult for the lithium to penetrate it, thus causing a loss of electrochemical performance (lower capacity and poor rate performance). If the LNO/LNMO cathode has a high porosity, than an encapsulation without filling of the porosity is difficult, so much more polymer is needed to cover the surface with LiF. In an example embodiment, the amount of polymer is between 0.1% to 2% by weight. If the polymer loading is less than 0.1% it is difficult to achieve a good film. If it exceeds 2% the capacity of the powder could be lowered. A polymer loading of 0.2-0.5% by weight is used in another example embodiment.

The LiF type shell protects the LNMO or LNO cathode powder from the time of its preparation, until the time of slurry making. The protection mechanism is determined by the absence of Li on the surface of the core, all the Li being extracted from it to form the LiF shell. Thereby (1) the significant moisture uptake by the powder, (2) the significant transformation rate of LiOH type base towards $Li_2CO_3$ type of base, and (3) the moisture driven increase of total base content are all suppressed. In the production of the final positive electrode, during the slurry making step, the LiF interface remains.

As said above, a particular embodiment of the coating step is dry coating followed by a heating step to a temperature significantly higher than the melting temperature of the polymer. Only if the melting temperature is far exceeded the molten polymer reacts with the surface base and efficiently wets the surface of the LNO/LNMO particles.

Another particular process embodiment consists in the heat treatment of a powder mixture of LNMO or LNO and a PVDF based polymer powder, where the heat treatment temperature exceeds 300° C., which is at least 140° C. above the melting temperature of the PVDF (different PVDF's have melting temperatures up to 170° C.). In yet another particular process the heat treatment temperature for PVDF is about 350° C. If the temperature is lower than 300° C. then the polymer might melt but could not react completely. If the temperature exceeds 470-500° C. the extra heat only increases cost, and eventually the homogeneous LiF layer is destroyed. As PTFE has a melting temperature around 330° C., it is clear that the heating temperature for obtaining a LiF layer will be at least 380° C. in case PTFE is used as initial polymer.

It is appropriate to mention that in US2009/0194747A1 (assigned to INCO) the PVDF binder material is applied at a temperature below its decomposition temperature so no LiF film forms and all applied polymer remains present and is chemically unchanged.

The INCO patent does the polymer coating step in a liquid phase—either at high temperature or (preferred) in dissolved form. The INCO patent observes poor adhesion between polymer and cathode powder—and thus adds lewis acid like oxalic acid to improve the adhesion, and specifically also to neutralize any LiOH on the cathode material surface, to avoid its reaction with the PVDF.

The embodiments of the covering method explained before follow a different concept. First, the mixture of polymer and cathode is typically done at room temperature and in solid form. Then the mixture is heated to a temperature where the decomposition of the polymer starts through the reaction with the cathode powder surface. The time of the heat treatment is long enough so that the polymer at the polymer-cathode interface sufficiently reacts to form a LiF based interfacial film. Secondly, no Lewis acid needs to be added. It was discovered that—surprisingly—the poor adhesion between cathode and polymer is caused by the low heating temperature. If the temperature is increased, so that the polymer and the cathode surface start a chemical reaction, a very strong adhesion is obtained. Infact, an excellent wetting of the molten polymer onto the surface of the cathode power particles is observed. It is believed that the excellent wetting is an evidence for the decomposition of polymer on the cathode surface.

Naturally LNMO cathode materials are of interest for cylindrical cells. This is because of their high capacity, and because the drawback of LNMCO, which is gas evolution—which is believed to be related to the base content—is manageable in cylindrical cells (cylindrical cells have a very rigid case). Currently, implementation to prismatic cells is more difficult, and practically impossible for polymer cells because the swelling is not easy to manage. LNMO cathode materials according to the present invention have a lower base content because a LiF film replaces the surface base. Also, they have an improved safety, which would allow to implement such cathodes into prismatic or even polymer cells.

The invention may be practiced, for example, by way of the different examples described below.

EXAMPLE 1

This example demonstrated that a stable and dense surface layer of LiF is achieved by mixing with PVDF, followed by a heat treatment to a temperature of about 300-350° C. The example also demonstrates that a similar surface coating cannot be achieved after a high temperature treatment.

Large particles of $LiCoO_2$ was chosen because it has a suitable "simple" morphology. Large particle LCO has a small surface area and mostly non-agglomerated particles. In this case the presence of a dense surface layer of LiF can be detected by coin cells. If such a layer is present at sufficient thickness the cathode material will have very poor performance, caused by the highly resistive (electronic Et lithium ion) surface layer.

The example shows results for samples prepared by adding 1% PVDF polymer. A lithium cobalt oxide mass production sample is used as cathode precursor. Its composition is 1 mol % Mg doped $LiCoO_2$, having a mean particles size of 17 μm. 1000 g of this precursor powder and 10 g of PVDF powder are carefully mixed using a Hensel type mixer. The mixture is sampled to batches of 150 g each. These batches are heat treated for 9 h at temperatures ranging from 150-600° C. The resulting powder is sieved. The powders are analyzed by coin cell testing and SEM. Whereas at 150-250° C. still polymer is present (the sample is hydrophobic) the sample changes surface properties (becoming hydrophilic) at about 300° C. and above. We attribute this to the absence of polymer, indicating that a LiF surface film has formed.

FIGS. 1.1 and 1.2 show SEM micrographs of the coated $LiCoO_2$ at 300° C. and at 600° C. The pictures of FIG. 1.1 illustrate that a thin film covers the particles. At 350° C. the $LiCoO_2$ looks very similar to an uncoated reference, indicating a smooth and homogenious coating by a LiF film. The pictures of FIG. 1.2 illustrate that the surface has changed—small pores are present, as well large crystals, where some of the crystals form well-shaped cubic crystals. At 600° C. the surface film is damaged and well formed crystals, possibly being LiF, are created. The creation of the crystals proves that LiF does not wet the surface at higher temperature. It is seemingly impossible to achieve a LiF film by direct high temperature synthesis. Obviously the LiF film has dissolved from the surface to recrystallize. This is a strong evidence that a stable LiF cannot be created at, and will not survive a too high T treatment. It is assumed that the LiF film at low temperature originates from the wetting of PVDF on the $LiCoO_2$ but that a LiF film itself (at sufficient high temperature to allow for LiF diffusion) does not wet the $LiCoO_2$ surface.

The heat treated samples were tested in coin cells. Table 1.1 summarizes the obtained results.

TABLE 1.1

Charge (QC), Discharge (QD) and Irreversible capacities (Q irr) of LCO samples treated at different temperatures.

| Sample | Heating Temperature | QC mAh/g | QD mAh/g | Qirr % |
|---|---|---|---|---|
| LC0349 | 150° C. | 160.18 | 152.38 | 4.87 |
| LC0350 | 200° C. | 160.08 | 152.31 | 4.86 |
| LC0351 | 250° C. | 158.15 | 148.22 | 6.28 |
| LC0352 | 300° C. | 100.79 | 69.01 | 31.53 |
| LC0365 | 350° C. | 59.32 | 39.69 | 33.10 |
| LC0370 | 600° C. | 163.26 | 145.03 | 11.17 |

At 300 and 350° C. a very low capacity is observed, whereas at lower temperature as well as at higher temperature a larger capacity is observed. This is easily explained by the creation of a LiF surface film. Below 300° C. only a very thin film has formed, whereas at high temperature the film has dissolved to re-crystallize. At 300 and 350° C. the film is too thick and dense to allow for a sufficient penetration of lithium into the particles.

FIG. 1.3 (Voltage (V) vs. cathode capacity (mAh/g)) shows the discharge voltage profile (4.3-3.0V, 0.1C rate) of the samples in Table 1.1 prepared with 1% PVDF at different temperatures (150-200-250-300-350 & 600° C.). Samples prepared at lower temperature (150° C., 200° C.) show exactly the same discharge voltage profile. The profile of the PVDF treated samples is similar but has—as expected—slightly lower capacity (about 1% less) than the reference (data not shown). The reference is the untreated sample used as precursor. Since specific capacity uses sample mass (thus it includes the weight of the polymer coating) 1% less capacity is expected.

The voltage profile is typical for $LiCoO_2$ with high Li:Co ratio, because no phase transition at 4.1V is detected. The 250° C. sample shows a different voltage profile, the profile is typical for a $LiCoO_2$ having a poor rate performance. The polarization is larger (voltage depression) and the end of discharge is much less square type (more rounded). This is attributed to a very thin, insulating LiF interfacial layer formed between the polymer coating and the $LiCoO_2$ surface. This LiF layer is fully covering the surface and has low ionic and electronic conductivity, causing the low rate voltage profile.

With increasing temperature (300° C., 350° C.) the capacity deteriorates dramatically. This clearly indicates the formation of a resistive LiF layer with increasing thickness. It is however still possible to benefit from the presence of the LiF layer without the disadvantage of a poor rate performance by decreasing the amount of PVDF in the powder-polymer mixture to 0.2 or even 0.1 wt %.

If the preparation temperature is increased further, at 600° C. we observe almost near full capacity, improved rate performance (not shown) and a clear phase transition at 4.1V. These data at 600° C. show that a resistive LiF surface layer is absent. (Normally the 4.1V phase transition is only observed for Li deficient or stoichiometric $LiCoO_2$). The capacity value is consistent with the proposed reaction $LiCoO_2 + \alpha F \rightarrow \alpha LiF + CoO_x + 1 - \alpha LiCoO_2$.

Obviously, at elevated temperature the homogeneous LiF surface layer is destroyed and large fractions of the surface are not covered by a LiF layer anymore. The data are fully consistent with the SEM which shows a damaged surface and the creation of larger LiF crystals, and LiF agglomerates without covering larger fractions of the surface.

Conclusion of Example 1: No LiF film is present below 200° C. At 250° C. an insulating thin film forms. At 300 and especially at 350° C. the LiF film is fully evolved basically insulating the particle and hence, causing very poor electrochemical performance. At 600° C. the LiF film is dissolved.

EXAMPLE 2

This example illustrates that a LiF coated sample shows clearly better performance than the reference samples. The samples of this example are:
(1) a LiF coated LMNCO sample: CTD
(2) a fluorine doped sample obtained by high temperature preparation: DPD
(3) a fluorine free reference sample: REF A mass production mixed metal hydroxide MOOH with $M = Ni_{0.5}Mn_{0.3}Co_{0.2}$ (having a D50 of about 10μ in the particle size distribution), lithium carbonate and Arkema Kynar® are used as precursors. For the LiF coated sample 0.3 wt % PVDF is used to achieve a LiF surface layer of appropriate thickness. In order to achieve samples with the same composition—especially similar Li content in the crystal structure—and the same crystallite size as well as similar morphology, several series of samples are prepared. The final samples have almost identical BET surface area, particle size (measured by laser diffraction), morphology (SEM) and also the Rietveld refinement parameters of the X-ray diffraction pattern are almost identical.

Since some fluorine evaporates during preparation, the fluorine content is varied so as to achieve the same amount of fluorine on the surface for samples DPD and CTD (as confirmed by liquid chromatography after dissolution of surface fluorine). Additionally the total fluorine content is measured by liquid chromatography after digestion in acid and suitable distillation of the fluorine.

TABLE 2.1 summarizes the samples preparation:

| | Preparation | | | Final sample | |
|---|---|---|---|---|---|
| | 1st cook | | | Fluorine (ppm) | |
| Sample | precursor | Li:M, F | Treatment | Insoluble | Soluble |
| REF | $Ni_{0.5}Mn_{0.3}Co_{0.2}OOH$ | 1.01 | 10 h, 950° C. none | <100 | <100 |
| DPD | | 1.02, 0.47 w % PVDF | 10 h, 920° C. | 2400 | 800 |
| CTD | | 1.015 | 10 h, 950° C. 0.3 w % PVDF 350° C., 5 h | 1800 | 700 |

The prepared samples are investigated by pH titration (content of soluble base), BET, SEM X-ray and Rietveld refinement of the XRD pattern and by coin cell testing. Unit cell data per formula unit $LiMO_2$ scatter by less than 0.1%, crystallinity obtained by the Rietveld refinement by less than 4%. BET surface area of all samples is similar, scattering less than 4%.

The soluble base content is determined by pH titration of washed samples: PVDF coated samples are often strongly hydrophobic, which makes a pH titration in aqueous solution difficult. Therefore samples of 7.5 g are first wetted in 10 g acetone, then 90 g water is added, followed by stirring for 10 minutes. After filtering the content of soluble base in the clear filtrate is titrated by standard pH titration using 0.1M HCl.

TABLE 2.2 summarizes the electrochemical and physico-chemical results:

| Sample | Coin Cell Testing: Capacity & rate 4.3-3.0 V, 25° C., Li metal anode | | | | | Fading rate (per 100 cyc) | | Physical | |
|---|---|---|---|---|---|---|---|---|---|
| | DC Q mAh/g | Qirr % | Rate (per 0.1 C) | | | Capacity | | Base | |
| | | | 1 C (%) | 2 C (%) | 3 C (%) | 0.1 C (%) | 1 C (%) | BET $m^2/g$ | µg/mol |
| REF | 170.45 | 11.13 | 91.60 | 88.06 | 85.36 | 4.54 | 9.64 | 0.269 | 74.3 |
| DPD | 169.17 | 11.71 | 91.21 | 87.26 | 84.61 | 2.42 | 7.82 | 0.270 | 70.2 |
| CTD | 171.52 | 11.04 | 91.61 | 87.82 | 84.92 | 0.27 | 5.20 | 0.260 | 36.6 |

Obviously, the coated (CTD) sample shows the best performance. It has the lowest base content, and the best cycle stability at 4.5V. It also shows high capacity and good rate performance.

FIG. 2 illustrates the results of coin cell testing for the LiF coated sample CTD (bottom) compared to the reference REF (top). Note the small "overshoot" feature at the first charge for CTD. Such an "overshoot" is usually observed for LiF treated samples but not for fluorine free or fluorine doped samples. It indicates that—before the LiF surface becomes electrochemically active—an activation happens.

In this and all of the following examples, electrochemical performance is tested in coin type cells, with a Li foil as counter electrode in a litium hexafluorite ($LiPF_6$) type electrolyte at 25° C. Cells are charged to 4.3 V and discharged to 3.0 V to measure rate performance and capacity. The capacity retention during extended cycling is measured at 4.5V charge voltage. Specific capacity of 160 mAh/g is assumed for the determination of the discharge rates. For example, for discharge at 2 C, a specific current of 320 mA/g is used. This is an overview of the test:

| Cycle | Charge | Discharge | |
|---|---|---|---|
| 1 | 4.3 V, 0.1 C | 3.0 V, 0.1 C. | Voltage profile |
| 2-6 | 4.3 V, 0.25 C | 3.0 V, 0.2, 0.5, 1, 2, 3 C | Rate performance |
| 7, 31 | 4.5 V, 0.25 C | 3.0 V, 0.1 C | Slow reference cycle before and after stability |
| 8, 32 | 4.5 C, 0.25 C | 3.0 V, 1 C | Fast reference cycle before and after stability |
| 9-30 | 4.5 V, 0.25 C | 3.0 V, 0.5 C | Stability test |

The following definitions are used for data analysis: (Q: capacity, D; Discharge, C; Charge)

Irreversible capacity Q(irr) is (QC1−QD1)/C1

Fade rate (0.1C) per 100 cycles: (1−QD31/QD7)*100/23

Fade rate (1.0C) per 100 cycles: (1−QD32/QD8)*100/23

Energy fade: instead of discharge capacity QD the discharge energy (capacity x average discharge voltage) is used.

On FIG. 2—both top and bottom—the left graph illustrates the cycling voltage versus the cathode capacity for the 6 first discharge cycles, who have increasing discharge rates as given above. Hence cycle 1 has the highest capacity (the line most to the right), and cycle 6 the lowest (the line most to the left). Also the first charge curve is given. The middle graph illustrates the discharge curves for cycles 7, 31, 8 and 32, from right to left. The right graph illustrates the fade rate (capacity versus cycle number), where the top graph (small bullets) is for charging, and the bottom (large bullets) for discharging.

The data are strongly consistent with the hypothesis that
- the fluorine free sample does not have a LiF protecting film,
- the fluorine doped sample DPD contains some protecting LiF on the surfac, possibly in the form of separated crystals, but the surface is only partially covered.
- the CTD sample contains a thin protective LiF film.

EXAMPLE 3

This Example concerns the investigation of 3 samples (F-free, F-doped and LiF-coated) using X-ray Photoelectron Spectroscopy (XPS), to support the hypothesis of a protective and continuous LiF film to improve the battery performance. The example shows results for the samples prepared as described in Example 2 (REF, DPD, CTD).

The experiment illustrates that:
1) The F-doped sample DPD does not form a continuous and sufficiently thick LiF layer on the particle surface despite the fact that sufficient F is available in the particle.
2) The process based on F-containing polymer coating, followed by temperature treatment in a certain temperature range is capable of achieving a well-defined and continuous LiF layer with full decomposition of the F-polymer coating.

The results of the C, F and Li spectra are summarized in Table 3.1.

TABLE 3.1

Overview of apparent atomic concentrations (at %) measured at the surface after deconvolution of the C 1s, F 1s and Li 1s spectra into their different contributions.

| | Element | | | | | | | | |
|---|---|---|---|---|---|---|---|---|---|
| | C 1s | | | | Li 1s | | F 1s | | |
| | eV | | | | | | | | |
| | 284.8 | 286.7 | 288.2 | 289.7 | 54.4 | 55.2 | 685.0 | | |
| | Subspecies | | | | | | | | LiF |
| | C—H | C—O | C=O | —$CO_3$ | $Li^+$ ($Li_2CO_3$) | $Li^+$ (LiF) | $F^−$ (LiF) | Li/F ratio | thickness (nm) |
| REF (F-free) | 9.9 | 1.0 | 0.6 | 4.9 | 15.2 | / | 0 | / | / |
| DPD (F-doped) | 8.3 | 1.0 | 0.7 | 2.2 | 14.6 | / | 3.9 | 3.74 | 0.3 |

TABLE 3.1-continued

Overview of apparent atomic concentrations (at %) measured at the surface after deconvolution of the C 1s, F 1s and Li 1s spectra into their different contributions.

| | | | | | | | | | |
|---|---|---|---|---|---|---|---|---|---|
| CTD (LiF-coated) | 9.3 | 1.2 | 1.0 | 0.5 | / | 15.1 | 15.8 | 0.95 | 1.5 |

Conclusions for Table 3.1:

1  C 1s:
   1.1   Typical presence of $CO_3$ for the F-free sample and small decrease in $CO_3$ levels for F-doped sample DPD
   1.2   Strong decrease in $CO_3$ for PVDF heat-treated sample CTD. Almost all $CO_3$ on the particle surface is consumed. All of the $Li_2CO_3$ surface base can be removed by heating at a high temperature for at least one hour.
   1.3   At 350° C. (sample CTD), the PVDF-coating used as the F-source is completely decomposed (and converted into LiF) as proven by the absence of $CF_2$—$CF_2$ peaks at 292.0 eV. (data not shown in Table 3.1)
2  F 1s:
   2.1   Despite that the F-doped DPD contains overall more fluorine than the F-coated sample CTD (see Example 2), the F measured using XPS in the coated sample CTD is much higher as compared to the doped sample. This can easily be explained by the fact that XPS is a surface sensitive technique with a typical penetration depth of ~5 nm. Hence, this proofs that the F-coated samples CTD is truly F-coated, whereas the DPD sample possibly contains a surface with little coverage, possibly by LiF crystals.
3  Li 1s:
   3.1   In the F-free REF and F-doped DPD sample, the Li is mainly present as $Li_2CO_3$ surface base. The high Li/F ratio indicates that not all Li on the particle surface is transformed into LiF.
   3.2   In the F-coated sample CTD, the Li is present as LiF, indicating the transformation of PVDF into LiF. This process uses the $Li_2CO_3$ as the source of Li. The Li/F ratio very close to 1 indicates that all Li on the particle surface is transformed into LiF.

In Table 3.1 the LiF thickness calculations are based upon standard exponential attenuation of the photoelectron intensity as a function of traveled distance as described by van der Marel et al. in *Journal of Vacuum Science and Technologies A*, 23 (5) 1456-1470 (2005). It is assumed that the layer structure of the present samples is as follows: bulk $MnO_x$, $CoO_x$, $NiO_x$, C in —$CO_3$ and $Li^+_{rest}$/Li and $F^-$ in LiF/organic C, organic F and O-org and that the LiF forms a homogeneous layer.

A distinct LiF film with a thickness of 1.5 nm is formed only for the F-coated sample. The calculation for F-doped clearly show a very thin LiF layer of only 0.3 nm, which is easily explained by insufficient coverage. This thickness is too low to form a continuous layer. Combined with the results of Example 2 it can be concluded that an effective LiF film should have a thickness of at least 0.5 nm, or at least 0.8 nm, and even at least 1 nm. The formation a continuous overlayer of LiF in the case of PVDF-coating followed by temperature treatment (sample CTD) is confirmed by a strong decrease in O signal (see also Table 3.2 below). For the F-doped sample this decrease cannot be observed (there is even a small increase), indicating that the formed LiF is very thin and discontinuous.

TABLE 3.2

Overview of apparent atomic concentrations (at %) measured at the surface after deconvolution of the Ni 2p, Mn 2p, Co 2p and O 1s spectra into their different contributions.

| Element | Co 2p | Mn 2p | Ni 2p | O 1s |
|---|---|---|---|---|
| eV | 780.0 | 642.3 | 855.0 | / |
| Subspecies | $CoO_x$ | $MnO_x$ | $NiO_x$ | / |
| REF (F-free) | 2.3 | 3.3 | 9.7 | 52.4 |
| DPD (F-doped) | 2.7 | 4.1 | 12.1 | 48.6 |
| CTD (LiF-coated) | 1.6 | 5.7 | 9.6 | 39.2 |

The data clearly confirm a continuous coverage of the particles by a LiF film only in the case of CTD sample because the signals of Mn2p, Co2p, Ni2p and oxygen 1S are suppressed.

The above XPS data clearly support the following model on F-presence:

1 F-free: no reaction with F possible, hence normal high $CO_3$ levels observed at the surface.

2 F-doped: a thin and discontinuous layer of LiF is formed at the surface. The formation of this thin LiF layer is insufficient to fully remove the $Li_2CO_3$ surface base.

3 F-coated: the PVDF coating is completely decomposed at 350° C. and a protective (continuous) LiF coating is formed with a well-defined thickness. The Li in this LiF is coming from the consumption of $Li_2CO_3$ on the particle surface. Hence a strong decrease in $Li_2CO_3$ surface base is observed. The F in the LiF layer is coming from the PVDF coating, and the LiF covers the particle with a continuous layer.

EXAMPLE 4

This example illustrates that LiF coating as described before allows to improve the properties of real commercial sized cells. In particular the LiF coating is very efficient to decrease the swelling during heat exposure of charged cells. The example reproduces the results of Examples 1 and 2 for larger scale samples. These samples are additionally tested in polymer type full cells. In all Examples mass production LNMO (M=$Ni_{0.5}Mn_{0.3}Co_{0.2}$) with Li:M of approx. 1.0 is used as precursor. The precursor further contains 0.145 mol % 5 and 142 ppm Ca.

EXAMPLE 4a 0.3% PVDF at 300° C.: 50 g mass production LNMO and 2.7 g PVDF powder are pre-mixed in 2 batches using a coffee grinder. The mixture is added to 1.6 kg of LNMO and mixing continues using a Hensel type mixer using a 2 L vessel. The mixture is heat treated at 300° C. in a convection oven for 5 h, followed by sieving.

EXAMPLE 4b 0.3% PVDF at 350° C.: similar as example 4a with the exception that the heat treatment temperature is 350° C.

Tests are performed in a similar manner as in Examples 1-3, additionally 800 mAh wound pouch type cells are assembled and tested (such type of cell is described in e.g. the prior art of U.S. Pat. No. 7,585,589). Table 4.1 summarizes the results.

TABLE 4.1

| Larger size samples, preparation and test results | | | | | | | |
|---|---|---|---|---|---|---|---|
| Sample | Preparation | Base µmol/g Before | Base µmol/g After | Moisture ppm After | QD C/10 mAh/g | Rate 2 C (%) | Volume Unit cell A$^3$ | Size nm |
| 4a EX0305 | 0.3%, 300° C. | 28.6 | 32.5 | 464 | 166.8 | 87.2 | 33.8711 | 145 |
| 4b EX0295 | 0.3%, 350° C. | 28 | 35.5 | 335 | 168.4 | 86.6 | 33.8787 | 147 |
| LNMO ref. | 0% | 59.9 | 73.9 | 572 | 167.25 | 87.64 | 33.8650 | 147 |

QD: discharge capacity;

Rate: in % vs 0.1 C,

Base: before and after humidity chamber exposure (expore for 5 days, at 50% humidity, at 30° C.), Moisture: after humidity exposure.

The table allows for the following conclusions:
1) 0.3%@ 300° C. sample: The moisture stability is acceptable, the total base is low, less than 50% of the reference. This indicates that the LiF coating layer is developed and the decomposition of the polymer has consumed most of the base. We observe a slight decrease of unit cell volume, consistent with the extraction of some lithium from the bulk.
2) 0.3% @ 350° C. sample: the moisture content is better than at 300° C.

Table 4.2 summarizes the pouch cell testing results. A dramatic decrease of swelling after high temperature storage (4 h, 90° C.) is observed. The swelling is the ratio of cell thickness after 4 h measured when the cell is still hot (90° C.) compared to the thickness measured before the test (cold). Several further tests with differently treated samples are performed, but only the PVDF treated samples show a dramatically reduced swelling, much lower than the typical obtained figures of 40-50%. We furthermore observe that all PVDF treated cells pass the overcharge test which indicates improved safety performance. Overcharge is done at 700 mA until 5.5V is reached. Passing means that no fire or smoke event happens. Nailing test is done using a 2.5 mm diameter sharp nail at a speed of 6.4 mm per second. Passing means no smoke or fire.

TABLE 4.2

| results of full cell testing using LNMO. | | | | |
|---|---|---|---|---|
| Sample | Preparation | Overcharge 1 C, 5.5 V Pass | Nail test 4.25 V Pass | Swelling (%) |
| 4c EX0305 | 0.3%, 300° C. | 2/2 | 5/5 | 25.1 |
| 4d EX0295 | 0.3%, 350° C. | 1/1 | 3/4 | 23.4 |
| LNMO ref. | 0% | 0/2 | 3/4 | 46.3 |

EXAMPLE 5

This example demonstrates LiF coating for high nickel based (LNO) cathode materials (e.g. $LiNi_{0.8}Co_{0.15}Al_{0.05}O_2$). In the case of such cathodes several issues are of practical importance:
(1) reduction of carbon impurity
(2) lowering of total dissoluble base
(3) improvement of moisture stability
(4) improvement of cycle stability a safety The example will illustrate that LiF coating dramatically improves these properties.

A pilot plant sample $LiNi_{0.8}Co_{0.15}Al_{0.05}O_2$ was used as precursor. The cathode was carefully blended mixed with PVDF powder, using 0%, 0.3%, 0.5% and 1% PVDF in the blend. The blends were tempered in a flow of air for 5 h at different temperatures. Samples were prepared at 150, 200, 250, 300 and 350° C. Immersion in water shows that samples prepared at 300 and 350° C. are not hydrophobic, thus the PVDF polymer has completely reacted. The complete reaction is confirmed by carbon sulfur analysis. Thus under these conditions the fluorine in the polymer has reacted with lithium to form a LiF film. Contrary to this, samples prepared at 200 and 250° C. are polymer coated, hydrophobic and exhibit only a very thin LiF interfacial film separating the polymer and the cathode.

The resulting cathode materials are tested as follows:

soluble base is measured by pH titration (described above), carbon content by carbon sulfur analysis, the base content is re-measured after 5 days humidity chamber exposure (50% humidity, 30° C.), coin cells are made from the as prepared cathodes (as described above).

TABLE 5.1 summarizes the results for the for PVDF treated samples prepared at different temperatures using different amounts of PVDF:

| | Dry room: | | | pH titration | | Moisture |
| --- | --- | --- | --- | --- | --- | --- |
| | | | | Before | After | |
| Sample | PVDF | T | C ppm | Base um/g | Base um/g | $H_2O$ ppm |
| QX0101 | 0% | 250° C. | | 337.5 | 0.33 | 1,836 |
| QX0104 | 0.3% | 350° C. | 825 | 251.5 | 0.40 | 1,170 |
| QX0107 | 1.0% | 350° C. | 254 | 182.7 | 0.55 | 1,071 |
| QX0119 | 0.5% | 150° C. | | 346.3 | 0.30 | 1,514 |
| QX0120 | 0.5% | 200° C. | | 330.1 | 0.33 | 1,649 |
| QX0121 | 0.5% | 250° C. | | 304.0 | 0.38 | 1,470 |
| QX0122 | 0.5% | 300° C. | | 223.4 | 0.55 | 1,259 |
| QX0123 | 0.5% | 350° C. | 582 | 212.9 | 0.51 | 886 |

| | | Coin Cell Schedule R4345, 25° C. | | | Fading rate (per 100 cycle) | | | |
| --- | --- | --- | --- | --- | --- | --- | --- | --- |
| Dry | | | Rate (per 0.1 C) | | | Capacity | | Energy |
| room Sample | DC Q mAh/g | Qirr % | 1 C (%) | 2 C (%) | 3 C (%) | 0.1 C (%) | 1 C (%) | 0.1 C (%) | 1 C (%) |
| QX0101 | 194.82 | 9.99 | 91.30 | 88.65 | 86.86 | 1.93 | 8.03 | 2.70 | 11.41 |
| QX0104 | 192.34 | 10.74 | 90.53 | 87.51 | 85.47 | 0.93 | 4.54 | 1.64 | 6.33 |
| QX0107 | 185.32 | 13.55 | 90.45 | 87.13 | 84.75 | −6.23 | 4.44 | −4.53 | −0.86 |
| QX0119 | 192.62 | 10.42 | 91.43 | 88.84 | 87.18 | 5.27 | 11.55 | 5.92 | 18.64 |
| QX0120 | 192.04 | 10.57 | 91.30 | 88.69 | 86.90 | 3.20 | 9.68 | 3.86 | 14.70 |
| QX0121 | 191.45 | 10.65 | 90.87 | 88.14 | 86.35 | 0.00 | 6.06 | 0.86 | 7.64 |
| QX0122 | 191.03 | 10.59 | 90.37 | 87.52 | 85.15 | −0.90 | 3.30 | −0.12 | 3.36 |
| QX0123 | 188.83 | 11.98 | 90.56 | 87.73 | 85.09 | −2.23 | 4.15 | −1.02 | 2.82 |

FIGS. 3.1 to 3.4 illustrate some key results of this table. FIGS. 3.1 and 3.2 show key properties as function of PVDF treatment temperature. FIGS. 3.3 and 3.4 show key properties as function of PVDF content.

FIG. 3.1 (Left: energy fade rate at 1C—in % after 100 cycles—vs. heat treament temperature; Right: discharge capacity vs. heat treatment temperature) illustrates electrochemical testing results: a modest loss of capacity is observed, but a dramatic improvement of cycle stability as the treatment temperature increases.

FIG. 3.2 (Left: moisture after humidity chamber exposure vs. heat treament temperature; Right: base content vs. heat treatment temperature, top line is after humid air exposure, bottom line before) illustrates data relevant to a humidity exposure test: the moisture content observed after exposure at 50% humidity at 30° C. for 5 days decreases with treatment temperature. Similarly, the base content both before as well as after moisture exposure decreases with treatment temperature.

FIG. 3.3 (Left: energy fade rate at 1C—in % after 100 cycles—vs. PVDF blend ratio; Right: discharge capacity vs. PVDF blend ratio) and FIG. 3.4 (Left: base content vs. PVDF blend ratio, top line is after humid air exposure, bottom line before; Right: carbon content vs. PVDF blend ratio) illustrate that for 350° C. treatment 3 out of 4 key properties improve with increasing PVDF content. Moisture stability increases, base content before and after exposure decreases. However, with increasing PVDF content the reversible capacity decreases significantly. Hence 0.5 wt % PVDF might be a good compromise.

Obviously, for 350° C. treatment excellent results are obtained: low base content, high cycling stability, good moisture stability. With increasing PVDF the reversible capacity decreases, 0.5 wt % is a good compromise between performance improvement and capacity.

FIG. 3.5 shows the details of the coin cell testing for the 0.5 wt % 350° C. sample, Note the excellent stability, even at 4.5V. Such results have not been reported in the prior art, and on the countrary, $LiNi_{0.8}Co_{0.15}Al_{0.05}O_2$ is often mentioned as having poor cycling stability. The meaning of each line and graph in FIG. 3.5 is the same as in the discussion of FIG. 2.

It is believed that the improved stability is caused by two effects:

(1) replacement of $Li_2CO_3$ and LiOH basic salt located between grains. This salt decomposes at high potential in the cell, and hence the cathode looses electrical contact. Contrary to this, LiF is stable up to very high voltages of about 6V., and (2) protection of the surface by a LiF surface film which prevents the direct reducing attack of the electrolyte.

A careful observation of the voltage reveals significant changes: the polarization increases and the end of discharge is more rounded, which features promise an improved safety.

The invention can alternatively be described by the following clauses:

1. A lithium transition metal oxide powder for use in a rechargeable battery, comprising primary particles having a surface coated with LiF, wherein the soluble base content of the lithium transition metal oxide powder, determined by pH titration, is less than 60% of the soluble base content of the lithium transition metal oxide powder having uncoated primary particles.

2. The lithium transition metal oxide powder of clause 1, wherein the soluble base content of the lithium transition metal oxide powder is less than 50% of the soluble base content of the lithium transition metal oxide powder having uncoated primary particles, as determined by pH titration.

3. The lithium transition metal oxide powder of clause 1, wherein the surface of the lithium transition metal oxide powder is substantially free of lithium hydroxide and lithium carbonate.
4. The lithium transition metal oxide powder of clauses 1-3, wherein the lithium transition metal oxide is either one of $LiCo_dM_eO_2$, wherein M is either one or both of Mg and Ti, with $e<0.02$ and $d+e=1$;
$Li_{1+a}M'_{1-a}O_{2\pm b}M^1{}_kS_m$ with $-0.03<a<0.06$, $b<0.02$, wherein M' is a transition metal compound, wherein at least 95% of M' are selected from the group consisting of Ni, Mn, Co, Mg and Ti; $M^1$ consisting of either one or more elements of the group Ca, Sr, Y, La, Ce and Zr, with $0\leq k\leq 0.1$ in wt %; and $0\leq m\leq 0.6$, m being expressed in mol %; and
$Li_{a'}Ni_xCo_yM''_zO_{2\pm e}A_f$, with $0.9<a'<1.1$, $0.5\leq x\leq 0.9$, $0<y\leq 0.4$, $0<z\leq 0.35$, $e<0.02$, $0\leq f\leq 0.05$ and $0.9<(x+y+z+f)<1.1$; M" consisting of either one or more elements from the group Al, Mg, and Ti; A consisting of either one or both of S and C.
5. The lithium transition metal oxide powder of clause 4, wherein $M'=Ni_{a''}Mn_{b''}Co_{c''}$, with $a''>0$, $b''>0$, $c''>0$ and $a''+b''+c''=1$; and $a''/b''>1$.
6. The lithium transition metal oxide powder of clause 5, wherein $0.5\leq a''\leq 0.7$, $0.1<c''<0.35$, and $a''+b''+c''=1$.
7. The lithium transition metal oxide powder of any one of clauses 1 to 6, wherein the LiF coating layer has a thickness of at least 0.5 nm.
8. The lithium transition metal oxide powder of any one of clauses 1 to 7, wherein the LiF coating layer has a thickness of at least 0.8 nm.
9. The lithium transition metal oxide powder of any one of clauses 1 to 7, wherein the LiF coating layer has a thickness of at least 1 nm.
10. A method for covering a lithium transition metal (M) oxide powder with a LiF coating, the method comprising:
providing a transition metal precursor prepared from the co-precipitation of transition metal sulphates with a base
providing a lithium precursor being either one of $LiOH*H_2O$ or $LiNO_3$, both containing a carbonate impurity, or the lithium precursor being $Li_2CO_3$,
reacting the transition metal precursor and the lithium precursor at a temperature above 600° C., thereby obtaining a lithium transition metal (M) oxide powder carrying a $Li_2CO_3$ impurity,
mixing the lithium transition metal (M) oxide powder carrying a $Li_2CO_3$ impurity with a fluorine-containing polymer to form a powder-polymer mixture, and
heating the powder-polymer mixture at a temperature of at least 140° C., and at most 300° C., above the melting temperature of the fluorine-containing polymer.
11. The method according to clause 10, wherein the transition metal precursor is MOOH and wherein the base is NaOH.
12. The method according to clause 10, wherein the amount of fluorine-containing polymer in the powder-polymer mixture is between about 0.1 and about 2 wt %.
13. The method according to clause 11, wherein the amount of fluorine-containing polymer in the powder-polymer mixture is between about 0.2 and about 0.5 wt %.
14. The method according to clauses 10 or 12, wherein the fluorine-containing polymer is a PVDF, and the powder-polymer mixture is heated at a temperature of more than about 325° C. and less than about 380° C. for at least one hour.
15. The method according to clauses 12 or 13, wherein the powder-polymer mixture is heated at a temperature between about 340 and about 360° C. for at least one hour.
16. A process according to any one of clauses 10 to 15, wherein the lithium transition metal oxide is either one of $LiCo_dM_eO_2$, wherein M is either one or both of Mg and Ti, with $e<0.02$ and $d+e=1$;
$Li_{1+a}M'_{1-a}O_{2\pm b}M^1{}_kS_m$ with $-0.03<a<0.06$, $b<0.02$, wherein M' is a transition metal compound, wherein at least 95% of M' consists of either one or more elements of the group Ni, Mn, Co, Mg and Ti; $M^1$ consisting of either one or more elements of the group Ca, Sr, Y, La, Ce and Zr, with $0\leq k\leq 0.1$ in wt %; and $0\leq m\leq 0.6$, m being expressed in mol %; and
$Li_{a'}Ni_xCo_yM''_zO_{2\pm e}A_f$, with $0.9<a'<1.1$, $0.5\leq x\leq 0.9$, $0<y\leq 0.4$, $0<z\leq 0.35$, $e<0.02$, $0\leq f\leq 0.05$ and $0.9<(x+y+z+f)<1.1$; M" consisting of either one or more elements from the group Al, Mg, and Ti; A consisting of either one or both of S and C.
17. The process according to clause 16, wherein $M'=Ni_{a''}Mn_{b''}Co_{c''}$, with $a''>0$, $b''>0$, $c''>0$ and $a''+b''+c''=1$; and $a''/b''>1$.
18. The process according to clause 16, wherein $0.5a''0.7$, $0.1<c''<0.35$, and $a''+b''+c''=1$.
19. The process according to any one of clauses 10 to 18, wherein the LiF coating layer has a thickness of at least 0.5 nm.
20. The process according to any one of clauses 10 to 19, wherein the LiF coating layer has a thickness of at least 1 nm.
21. A core-shell lithium transition metal oxide powder comprising:
primary particles having a coated surface, wherein the soluble base content of the core-shell lithium transition metal oxide powder is less than 60% of the soluble base content of the core-shell lithium transition metal oxide powder having uncoated particles as determined by pH titration.
22. The core-shell lithium transition metal oxide powder of clause 21, wherein the surface is coated with LiF.
23. The core-shell lithium transition metal oxide powder of clause 21, wherein the primary particle is formed after precipitation and firing of the core-shell lithium transition metal oxide powder.
24. The core-shell lithium transition metal oxide powder of clause 21, further comprising a secondary particle, wherein the secondary particle is an agglomerate, and wherein both the primary and the secondary particles are coated.
25. The core-shell lithium transition metal oxide powder of clause 24, wherein the primary particles are formed before secondary particles are formed.
26. The lithium transition metal oxide powder of clause 21, wherein the lithium transition metal oxide is selected from the group consisting of:
$LiCo_dM_eO_2$, wherein M comprises Mg or Ti, with $e<0.02$ and $d+e=1$;
$Li_{1+a}K_{1-a}O_{2\pm b}M^1{}_kS_m$ with $-0.03<a<0.06$, $b<0.02$, wherein M' is a transition metal compound,
wherein 95% of M' comprises one or more elements of Ni, Mn, Co, Mg and Ti; $M^1$ comprises one or more elements of Ca, Sr, Y, La, Ce and Zr, with $0\leq k\leq 0.1$ in wt %; and $0\leq m\leq 0.6$, m being expressed in mol %; and
$Li_{a'}Ni_xCo_yM''_zO_{2\pm e}A_f$, with $0.9<a'<1.1$, $0.5\leq x\leq 0.9$, $0<y\leq 0.4$, $0<z\leq 0.35$, $e<0.02$, $0\leq f\leq 0.05$ and $0.9<(x+y+z+f)<1.1$, M" comprises one or more elements from the group Al, Mg, and Ti, and A comprises one or both of S and C.
27. A method for covering a lithium transition metal (M) oxide powder with an anionic coating, the method comprising:

providing a transition metal precursor prepared from the co-precipitation of transition metal sulphates with a base;

adding a lithium precursor;

reacting the transition metal precursor and the lithium precursor at a temperature above 600° C., thereby obtaining a lithium transition metal (M) oxide powder carrying a $Li_2CO_3$ impurity; mixing the lithium transition metal (M) oxide powder carrying a $Li_2CO_3$ impurity, with a fluorine-containing polymer to form a powder-polymer mixture;

heating the powder-polymer mixture at a temperature of at least 140° C. to 300° C. above the melting temperature of the fluorine-containing polymer covering the lithium transition metal (M) oxide powder with the anionic coating.

28. The method according to clause 27, wherein the transition metal precursor is MOOH and wherein the base is NaOH.

29. The method according to clause 27, wherein the lithium precursor is selected from the group consisting of $LiOH*H_2O$ with a carbonate impurity, $LiNO_3$ with a carbonate impurity, and $Li_2CO_3$.

30. The method according to clause 27, wherein the anionic coating is a LiF coating.

31. A method of forming a coated lithium transition metal (M) oxide powder, the method comprising:

providing a transition metal precursor prepared from the co-precipitation of transition metal sulphates with a base;

adding a lithium precursor selected from the group consisting of $LiOH*H_2O$ with a carbonate impurity, $LiNO_3$ with a carbonate impurity, and $Li_2CO_3$;

reacting the transition metal precursor and the lithium precursor at a temperature of above 600° C.; obtaining a coated lithium transition metal (M) oxide powder carrying a $Li_2CO_3$ impurity;

mixing the coated lithium transition metal (M) oxide powder carrying a $Li_2CO_3$ impurity with a fluorine-containing polymer to form a powder-polymer mixture, and heating the powder-polymer mixture at a temperature of at least 140° C. to 300° C. above the melting temperature of the fluorine-containing polymer.

32. The method according to clause 31, wherein the coated lithium transition metal (M) oxide powder comprises coated primary particles.

33. The method according to clause 32, further comprising a secondary particle, wherein the primary particle is a first formed particle and wherein the secondary particle is a subsequently formed particle.

While specific embodiments and/or details of the invention have been shown and described above to illustrate the application of the principles of the invention, it is understood that this invention may be embodied as more fully described in the claims and clauses, or as otherwise known by those skilled in the art (including any and all equivalents), without departing from such principles.

The invention claimed is:

1. A lithium transition metal oxide powder for use in a rechargeable battery, the powder comprising primary particles having a surface coated with a LiF coating layer, wherein the LiF coating layer is the reaction product of a fluorine-containing polymer and the surface of the uncoated primary particle, and wherein the lithium transition metal oxide powder has a soluble base content, determined by pH titration, that is less than 60% of the soluble base content of a lithium transition metal oxide powder having uncoated primary particles, wherein said LiF coating layer has a thickness of at least 0.5 nm.

2. The lithium transition metal oxide powder of claim 1, wherein the soluble base content of the lithium transition metal oxide powder is less than 50% of the soluble base content of a lithium transition metal oxide powder having uncoated primary particles, as determined by pH titration.

3. The lithium transition metal oxide powder of claim 1, wherein the surface of the lithium transition metal oxide powder is substantially free of lithium hydroxide and lithium carbonate.

4. The lithium transition metal oxide powder of claim 1, wherein the lithium transition metal oxide is selected from the group consisting of $LiCo_dM_eO_2$, wherein M comprises one or both of Mg and Ti, with $e<0.02$ and $d+e=1$;

$Li_{1+a}M'_{1-a}O_{2\pm b}$ $M^1_kS_m$ with $-0.03<a<0.06$, $b<0.02$, wherein M' is a transition metal compound, wherein at least 95% of M' is selected from the group consisting of Ni, Mn, Co, Mg and Ti; and $M^1$ comprises one or more elements selected from the group consisting of Ca, Sr, Y, La, Ce and Zr, with $0\leq k\leq 0.1$ in wt %; and $0\leq m\leq 0.6$, m being expressed in mol %; and $Li_aNi_xCo_y$ $M''_z$ $O_{2\pm e}$ $A_f$ with $0.9<a'<1.1$, $0.5\leq x\leq 0.9$, $0<y\leq 0.4$, $0<z\leq 0.35$, $e<0.02$, $0\leq f\leq 0.05$ and $0.9<(x+y+z+f)<1.1$; wherein M" comprises one or more elements selected from the group consisting of Al, Mg, and Ti, and A comprises one or both of S and C.

5. The lithium transition metal oxide powder of claim 4, wherein $M'=Ni_{a''}Mn_{b''}Co_{c''}$, with $a''>0$, $b''>0$, $c''>0$ and $a''+b''+c''=1$; and $a''/b''>1$.

6. The lithium transition metal oxide powder of claim 5, wherein $0.5\leq a''\leq 0.7$, $0.1<c''<0.35$, and $a''+b''+c''=1$.

7. The lithium transition metal oxide powder of claim 1, wherein the LiF coating layer has a thickness of at least 0.8 nm.

8. The lithium transition metal oxide powder of claim 7, wherein the LiF coating layer has a thickness of at least 1 nm.

* * * * *

UNITED STATES PATENT AND TRADEMARK OFFICE
CERTIFICATE OF CORRECTION

Page 1 of 3

PATENT NO. : 8,852,452 B2
APPLICATION NO. : 13/505595
DATED : October 7, 2014
INVENTOR(S) : Paulsen et al.

It is certified that error appears in the above-identified patent and that said Letters Patent is hereby corrected as shown below:

In the Specification

Column 1, line 32, replace "$LiNi_{0.80}CO_{0.15}Al_{0.05}O_2$" with --$LiNi_{0.80}Co_{0.15}Al_{0.05}O_2$--;

Column 2, line 33, replace "$M=Ni_{0.67}Mn_{0.22}CO_{0.11}$" with --$M=Ni_{0.67}Mn_{0.22}Co_{0.11}$--;

Column 4, line 14, replace "$LiCO_dM_eO_2$" with --$LiCo_dM_eO_2$--;

Column 4, line 23, replace "$Li_aNi_xCO_yM''_z$" with --$Li_aNi_xCo_yM''_z$--;

Column 10, line 37, replace:

"
TABLE 2.1 summarizes the samples preparation:

| | Preparation | | | Final sample | |
|---|---|---|---|---|---|
| | | 1st cook | | Fluorine (ppm) | |
| Sample | precursor | Li:M, F | Treatment | Insoluble | Soluble |
| REF | $Ni_{0.5}Mn_{0.3}Co_{0.2}OOH$ | 1.01 | 10 h, 950° C.   none | <100 | <100 |
| DPD | | 1.02, 0.47 w % PVDF | 10 h, 920° C. | 2400 | 800 |
| CTD | | 1.015 | 10 h, 950° C.  0.3 w % PVDF 350° C., 5 h | 1800 | 700 |

"

Signed and Sealed this
Third Day of March, 2015

Michelle K. Lee
*Deputy Director of the United States Patent and Trademark Office*

With:

Table 2.1 summarizes the samples preparation:

| Sample | Preparation | | | Treatment | Final sample Fluorine (ppm) | |
|---|---|---|---|---|---|---|
| | 1st cook | | | | Insoluble | Soluble |
| | precursor | Li:M, F | | | | |
| REF | $Ni_{0.5}Mn_{0.3}Co_{0.2}OOH$ | 1.01 | 10h, 950°C | none | < 100 | < 100 |
| DPD | | 1.02, 0.47w% PVDF | 10h, 920°C | | 2400 | 800 |
| CTD | | 1.015 | 10h, 950°C | 0.3w% PVDF 350°C, 5h | 1800 | 700 |

--;

Column 11, line 1, replace:

"
TABLE 2.2 summarizes the electrochemical and physico-chemical results:

| Sample | DCQ mAh/g | Qirr % | Rate (per 0.1 C) | | | Capacity | | BET m²/g | Base µg/mol |
|---|---|---|---|---|---|---|---|---|---|
| | | | 1C (%) | 2C (%) | 3C (%) | 0.1C (%) | 1C (%) | | |
| REF | 170.45 | 11.13 | 91.60 | 88.06 | 85.36 | 4.54 | 9.64 | 0.269 | 74.3 |
| DPD | 169.17 | 11.71 | 91.21 | 87.26 | 84.61 | 2.42 | 7.82 | 0.270 | 70.2 |
| CTD | 171.52 | 11.04 | 91.61 | 87.82 | 84.92 | 0.27 | 5.20 | 0.260 | 36.6 |

(Coin Cell Testing: Capacity & rate 4.3-3.0 V, 25°C, Li metal anode; Fading rate (per 100 cyc); Physical)
"

With:

Table 2.2 summarizes the electrochemical and physico-chemical results:

| Sample | Coin Cell Testing: Capacity & rate 4.3-3.0V, 25°C, Li metal anode | | | | | Fading rate (per 100 cyc) | | Physical | |
|---|---|---|---|---|---|---|---|---|---|
| | DC Q | Qirr | Rate (per 0.1C) | | | Capacity | | BET | Base |
| | mAh/g | % | 1C (%) | 2C (%) | 3C (%) | 0.1C (%) | 1C (%) | m²/g | µg/mol |
| REF | 170.45 | 11.13 | 91.60 | 88.06 | 85.36 | 4.54 | 9.64 | 0.269 | 74.3 |
| DPD | 169.17 | 11.71 | 91.21 | 87.26 | 84.61 | 2.42 | 7.82 | 0.270 | 70.2 |
| CTD | 171.52 | 11.04 | 91.61 | 87.82 | 84.92 | 0.27 | 5.20 | 0.260 | 36.6 |

--;

Column 12, line 45 through Column 13, line 5, replace:

TABLE 3.1

Overview of apparent atomic concentrations (at %) measured at the surface after deconvolution of the C 1s, F 1s and Li 1s spectra into their different contributions.

| Element | C 1s | | | | Li 1s | | F 1s | | |
|---|---|---|---|---|---|---|---|---|---|
| eV | 284.8 | 286.7 | 288.2 | 289.7 | 54.4 | 55.2 | 685.0 | Li/F ratio | LiF thickness (nm) |
| Subspecies | C—H | C—O | C=O | —CO$_3$ | Li$^+$ (Li$_2$CO$_3$) | Li$^+$ (LiF) | F$^-$ (LiF) | | |
| REF (F-free) | 9.9 | 1.0 | 0.6 | 4.9 | 15.2 | / | 0 | / | / |
| DPD (F-doped) | 8.3 | 1.0 | 0.7 | 2.2 | 14.6 | / | 3.9 | 3.74 | 0.3 |
| CTD (LiF-coated) | 9.3 | 1.2 | 1.0 | 0.5 | / | 15.1 | 15.8 | 0.95 | 1.5 |

"

With:

Table 3.1: Overview of apparent atomic concentrations (at%) measured at the surface after deconvolution of the C 1s, F 1s and Li 1s spectra into their different contributions.

| Element | C 1s | | | | Li 1s | | F 1s | Li/F ratio | LiF thickness (nm) |
|---|---|---|---|---|---|---|---|---|---|
| eV | 284.8 | 286.7 | 288.2 | 289.7 | 54.4 | 55.2 | 685.0 | | |
| Subspecies | C-H | C-O | C=O | -CO$_3$ | Li$^+$ (Li$_2$CO$_3$) | Li$^+$ (LiF) | F$^-$ (LiF) | | |
| REF (F-free) | 9.9 | 1.0 | 0.6 | 4.9 | 15.2 | / | 0 | / | / |
| DPD (F-doped) | 8.3 | 1.0 | 0.7 | 2.2 | 14.6 | / | 3.9 | 3.74 | 0.3 |
| CTD (LiF-coated) | 9.3 | 1.2 | 1.0 | 0.5 | / | 15.1 | 15.8 | 0.95 | 1.5 |

--;

Column 15, line 43, replace "0.3%®300°C" with --0.3%@300°C--.